United States Patent
Frid et al.

(10) Patent No.: US 9,626,312 B2
(45) Date of Patent: Apr. 18, 2017

(54) STORAGE REGION MAPPING FOR A DATA STORAGE DEVICE

(71) Applicant: SANDISK TECHNOLOGIES INC., Plano, TX (US)

(72) Inventors: Marina Frid, Jerusalem (IL); Igor Genshaft, Bat Yam (IL); Nicholas James Thomas, Dundee (GB)

(73) Assignee: SANDISK TECHNOLOGIES LLC, Plano, TX (US)

( * ) Notice: Subject to any disclaimer, the term of this patent is extended or adjusted under 35 U.S.C. 154(b) by 67 days.

(21) Appl. No.: 14/802,783

(22) Filed: Jul. 17, 2015

(65) Prior Publication Data

US 2017/0017588 A1   Jan. 19, 2017

(51) Int. Cl.
  *G06F 12/00* (2006.01)
  *G06F 13/18* (2006.01)
  *G06F 12/1009* (2016.01)
  *G06F 12/02* (2006.01)
  *G06F 3/06* (2006.01)

(52) U.S. Cl.
  CPC .............. *G06F 13/18* (2013.01); *G06F 3/064* (2013.01); *G06F 3/0688* (2013.01); *G06F 12/0246* (2013.01); *G06F 12/1009* (2013.01); *G06F 2212/656* (2013.01)

(58) Field of Classification Search
  CPC .............. G06F 12/0246; G06F 3/0679; G06F 2212/7204; G06F 3/0688; G06F 3/064; G06F 2212/7205
  See application file for complete search history.

(56) References Cited

U.S. PATENT DOCUMENTS

| | | | |
|---|---|---|---|
| 7,433,993 B2 | 10/2008 | Sinclair | |
| 7,631,138 B2 | 12/2009 | Gonzalez et al. | |
| 8,769,190 B1* | 7/2014 | Syu .................... | G06F 3/061 711/103 |
| 2011/0185123 A1* | 7/2011 | Matsunami ........... | G06F 3/0608 711/114 |
| 2013/0159601 A1 | 6/2013 | Lassa et al. | |
| 2014/0047178 A1* | 2/2014 | Kassai .................. | G06F 3/0689 711/114 |
| 2014/0185376 A1 | 7/2014 | Sinclair et al. | |

* cited by examiner

*Primary Examiner* — Hashem Farrokh
(74) *Attorney, Agent, or Firm* — Toler Law Group, PC (57) ABSTRACT

A data storage device includes a controller coupled to multiple groups of data storage dies, such as a meta-meta-die. The controller is configured to write data to a first meta-block if a storage size associated with a first group of data storage dies associated with a first priority is greater than or equal to a threshold storage size. The first meta-block includes a respective block of each data storage die of the first group. The controller is further configured to write the data to a second meta-block if the storage size associated with the first group is less than the threshold storage size. The second meta-block includes a respective block of each data storage die of the first group and further includes a respective block of each data storage die of the second group. Each data storage die of the second group is associated with a second priority.

21 Claims, 3 Drawing Sheets

STORAGE REGION MAPPING FOR A DATA STORAGE DEVICE

FIELD OF THE DISCLOSURE

This disclosure is generally related to data storage devices and more particularly to storage region mapping processes for data storage devices.

BACKGROUND

Non-volatile data storage devices may include multiple dies to store data. Each die of a data storage device may include multiple blocks, such as multiple erase groups of word lines in a NAND flash implementation.

Some storage devices use "meta-blocks" that include multiple blocks of a memory. In some cases, a meta-block may increase parallelism of a storage device, such as by enabling multiple read operations or multiple write operations to be performed in parallel.

Operation of a storage device may be simplified if a meta-block includes blocks of sequential (e.g., adjacent) dies. In this case, the storage device may use "compressed" information to indicate that logical addresses are associated with blocks of the meta-block. For example, a table may indicate that a range of logical addresses (e.g., logical addresses one through ten) are stored a range of word lines (e.g., word lines one through twenty) of a range of sequential dies (e.g., dies one, two, and three).

Selecting sequential dies for a meta-block may consume time and resources of the storage device. For example, if die two is busy completing an operation, then the storage device may "wait" to be able to write data to the meta-block (dies one, two, and three). "Waiting" for busy dies may reduce performance of the storage device, such as by increasing duration of write operations at the storage device.

DETAILED DESCRIPTION

A data storage device may dynamically determine a size (or "depth") of a meta-block based on a number of available adjacent memory dies (e.g., a number of sequential memory dies that are not busy performing an operation). Dynamically determining the depth of the meta-block may enable the data storage device to avoid "waiting" for one or more memory dies to become available (e.g., to complete an operation).

To illustrate, a write operation may write eight logical pages to a meta-block, such as by writing two logical pages to two physical pages of each of four adjacent memory dies. In this case, a depth of the meta-block may be equal to two (because two physical pages of each memory die store data of the meta-block). In other cases, three of the memory dies may be available and one of the memory dies may be busy. Instead of waiting for the busy memory die to become available, the data storage device may adapt a depth of the meta-block based on the number of available adjacent memory dies. In this example, the data storage device may write three logical pages to three physical pages of one available memory die, three logical pages to three physical pages of another available memory die, and two logical pages to two physical pages of the other available memory die. In this example, the depth of the meta-block may be equal to 8/3 (because three physical pages of two memory dies and two physical pages of one memory die store data of the meta-block, producing an "average" usage of 8/3 physical pages per memory die).

In some circumstances, the depth of a meta-block may fail to satisfy a threshold. For example, if a large number of memory dies are busy, or if blocks of available memory dies are relatively "full" of data, then a storage size associated with the meta-block may fail to satisfy a threshold storage size (and the meta-block may be too "shallow"). In this case, one or more lower priority memory dies may be selected for the meta-block, such as by selecting a memory die that is busy. Thus, the data storage device may operate using "best efforts" to identify higher priority memory dies for a meta-block and may select a lower priority memory die if a storage size associated with the higher priority memory dies fails to satisfy a threshold storage size.

Although meta-blocks have been described, in other cases another meta-region may be utilized. For example, a data storage device may write data to a group of meta-blocks (a meta-meta-block), a group of memory dies (a meta-die), or a group of meta-dies (a meta-meta-die), as described further below with reference to the drawings.

Particular examples in accordance with the disclosure are described below with reference to the drawings. In the description, common features are designated by common reference numbers. As used herein, "exemplary" may indicate an example, an implementation, and/or an aspect, and should not be construed as limiting or as indicating a preference or a preferred implementation. Further, it is to be appreciated that certain ordinal terms (e.g., "first" or "second") may be provided for identification and ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." As used herein, a structure or operation that "comprises" or "includes" an element may include one or more other elements not explicitly recited. Further, an operation performed "based on" a condition or event may also be performed based on one or more other conditions or events not explicitly recited.

Figure 1:
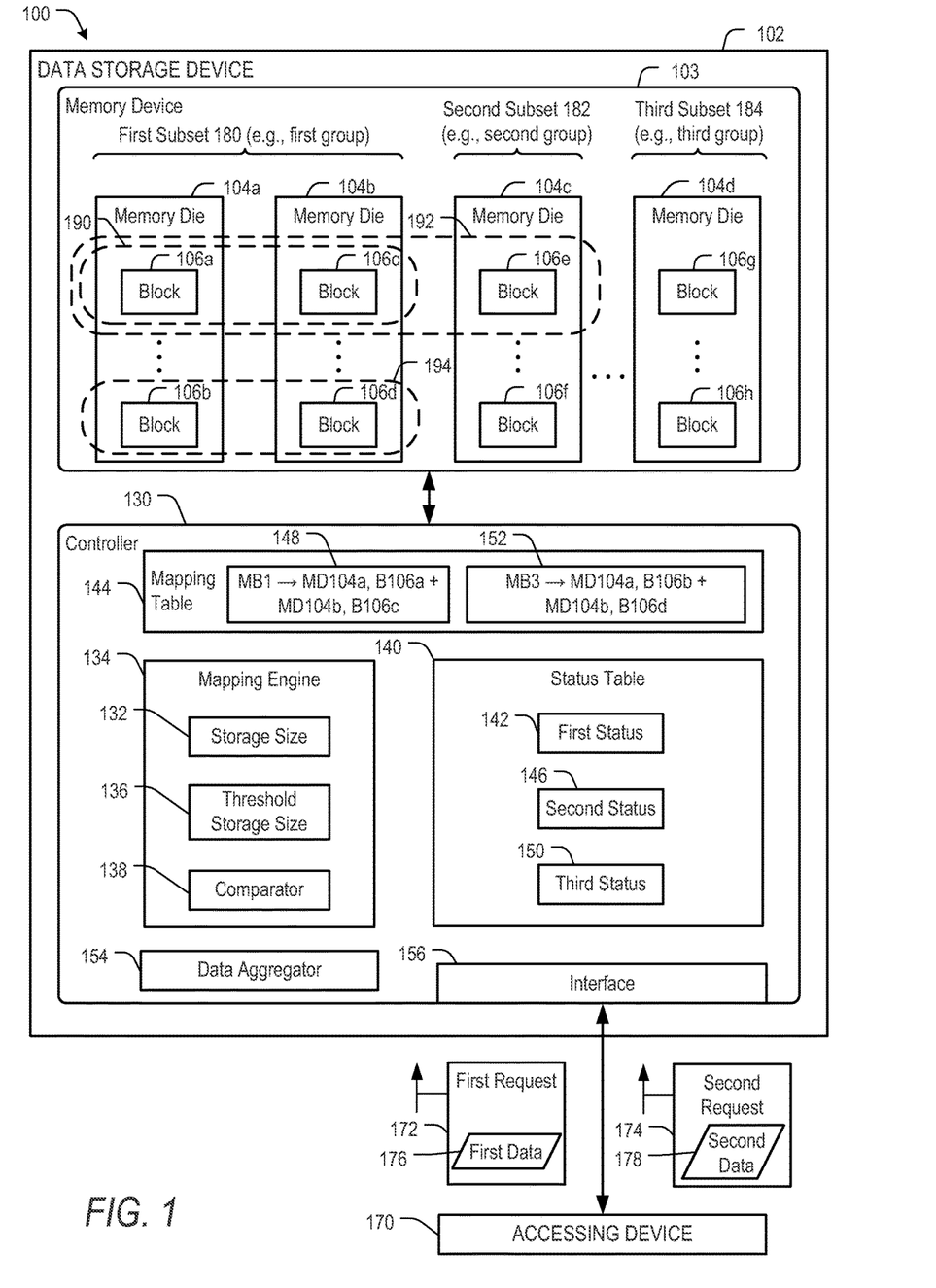
FIG. 1 is a block diagram illustrating certain aspects of an illustrative example of a system including a data storage device.

FIG. 1 depicts an illustrative example of a system 100. The system 100 includes a data storage device 102 and an accessing device 170 (e.g., a host device or another device).

The data storage device 102 includes a memory device 103 (e.g., a non-volatile memory, such as a NAND flash memory or a resistive memory). The memory device 103 includes a plurality of storage regions, such as a plurality of memory dies. To illustrate, FIG. 1 depicts that the memory device 103 may include memory dies 104a, 104b, 104c, and 104d (e.g., physical memory dies). A memory die is also referred to herein as a data storage die.

Each memory die of the memory device 103 may include multiple blocks (e.g., physical blocks). For example, the memory die 104*a* may include blocks 106*a*, 106*b*, and the memory die 104*b* may include blocks 106*c*, 106*d*. As another example, the memory die 104*c* may include blocks 106*e*, 106*e*, and the memory die 104*d* may include blocks 106*g*, 106*h*. An example of a block is an erase group of storage elements in connection with a NAND flash implementation of the memory device 103. In other cases, the memory device 103 may have another configuration, such as a resistive memory configuration. In this case, a block may include a particular storage region, such as a word line, a group of word lines, a bit line, or a group of bit lines, as illustrative examples.

The data storage device 102 may further include a controller 130 coupled to the memory device 103. The controller 130 includes a mapping engine 134. The controller 130 may further include a data aggregator 154 (e.g., a buffer) and an interface 156. The controller may store a mapping table 144 and a status table 140. The mapping engine 134 may be configured to access the mapping table 144 and the status table 140. For example, the mapping engine 134 may be coupled to a memory that stores the mapping table 144 and the status table 140, such as a random access memory (RAM) of the controller 130.

The controller 130 is configured to receive data and instructions from the accessing device 170 using the interface 156. The controller 130 may be configured to encode data to be stored at the memory device 103, such as by encoding user data to generate one or more ECC codewords. The controller 130 may be configured to decode data sensed from the memory device 103, such as by decoding one or more ECC codewords to generate user data.

The controller 130 is configured to send data and commands to the memory device 103 and to receive data from the memory device 103. For example, the controller 130 is configured to send data and a write command to cause the memory device 103 to store the data to a specified address of the memory device 103. The controller 130 is configured to send a read command to sense data from a specified address of the memory device 103. For example, the controller 130 is configured to send a read command to cause the memory device 103 to sense data from a specified address of the memory device 103.

During operation, the mapping engine 134 may use the mapping table 144 and the status table 140 to create one or more meta-regions. An example of a meta-region is a meta-block. A meta-block may include at least one block of one memory die and may further include at least one block of another memory die. For example, the mapping engine 134 may associate the block 106*a* with the block 106*c* to create a particular meta-block. As another example, the mapping engine 134 may associate the block 106*a* with the block 106*f* to create another meta-block.

Use of one or more meta-regions (e.g., a meta-block) may improve operation of the data storage device 102 in some cases. For example, use of one or more meta-regions may facilitate parallel write operations (or read operations) that write data to (or read data from) multiple blocks in parallel, which may reduce operation latency as compared to serial operations. As another example, certain information (such as an address mapping table) may be simplified using one or more meta-regions (such as if a table indicates a range of physical addresses for a set of logical addresses instead of indicating a separate physical address for each logical address).

In some devices, use of meta-blocks may create delays under certain conditions. To illustrate, if a meta-block includes a block of a die that is busy performing an operation, a device may "wait" for the die to complete the operation (so that the block and one or more other blocks of the meta-block may be accessed in parallel, such as for a write operation).

The mapping engine 134 may be configured to dynamically select of size of a meta-region (e.g., a meta-block) to reduce latency associated with "waiting" for a die to complete an operation. For example, when creating a meta-block (e.g., in response to receiving data from the accessing device 170 to be stored at the memory device 103), the mapping engine 134 may select a smaller number of memory dies of the memory device 103 that are not busy (instead of waiting for a larger number of memory dies of the memory device 103 to complete one or more operations). To enable use of the smaller number of memory dies for the meta-block, the mapping engine 134 may adaptively determine a "depth" of the meta-block (e.g., by counting a number of physical pages per block of the meta-block or an average number of physical pages per block of the meta-block). Thus, a duration of a read operation may be reduced by selecting meta-block size based on die status (by utilizing available memory dies that are not busy) as compared to "waiting" for a memory die to complete an operation (which may cause latency associated with waiting for a memory die to complete an operation.

To further illustrate, the mapping engine 134 may determine to create (or "open") a meta-region (e.g., a meta-block) during operation of the data storage device 102. A meta-block may be created in response to the controller 130 receiving a request from the accessing device 170, such as a first request 172 for write access to the memory device 103. The first request 172 may include first data 176. Alternatively or in addition, a meta-block may be created in response to another event. For example, a meta-block may be created in response to a "maintenance" operation, such as in connection with a data compaction (or "garbage collection") process that consolidates the first data 176 after the data is written to the memory device 103. During a data compaction process, a meta-block may be opened, and data (e.g., the first data 176) may be read from the memory device 103 and copied to the meta-block. Another example of a maintenance operation is a data relocation process, such as a data relocation process that moves the first data 176 from a source storage region (e.g., a less healthy storage region, such as a storage region with a relatively high program/erase cycle (PEC) count) to a destination storage region (e.g., a more healthy storage region, such as a storage region with a lower PEC count).

The mapping engine 134 may be configured to create (or "open") a meta-block having a size that is based on priorities (e.g., statuses) associated with memory dies of the memory device 103. A priority of a memory die may be based on whether the memory die is available for write operations, busy performing an operation (and temporarily unavailable for a write operation), or closed to write operations. For example, FIG. 1 illustrates that the status table 140 may indicate a first priority (e.g., a first status 142) associated with one or more memory dies of the memory device 103, a second priority (e.g., a second status 146) associated with one or more memory dies of the memory device 103, and a third priority (e.g., a third status 150) associated with one or more memory dies of the memory device 103. Although the example of FIG. 1 illustrates three statuses (the statuses 142, 146, and 150), in other cases a different number of statuses may be used (e.g., two statuses, four statuses, or another number of statuses). As an illustrative example, in some implementations, each memory die of the memory device 103 may be assigned a respective status (e.g., by ranking the memory dies of the memory device 103 by status).

To further illustrate, memory dies associated with the first status 142 may have a higher priority for write operations than memory dies associated with the statuses 146, 150. As an example, memory dies associated with the first status 142 may be relatively "healthy" (e.g., have been subject to fewer PECs) as compared to memory dies associated with the statuses 146, 150. In this example, the second status 146 may indicate that each memory die associated with the second status 146 or the third status 150 is less healthy than each memory die associated with the first status 142. Each memory die associated with the first status 142 may be available for a write operation and may not be scheduled for a maintenance operation (e.g., a data compaction process or a data relocation process). For example, if a fragmentation criterion associated with a memory die (e.g., a number of portions of a file that are stored non-consecutively (or are "fragmented") at the memory die) is less than a threshold, then the memory die may be associated with the first status 142.

Each memory die associated with the second status 146 may be temporarily unavailable for a write operation (e.g., due to being busy) or may have a low priority (e.g., due to being scheduled for a maintenance operation). For example, a memory die may be associated with the second status 146 if the memory die is scheduled as a source compaction storage region of a data compaction process (e.g., if a fragmentation criterion associated with the memory die is greater than or equal to a threshold). In this case, writing data to the memory die may be avoided prior to performing the data compaction process (to reduce an amount of data copying during the data compaction process). In some cases, a destination compaction storage region may be associated with the second status 146 (e.g., if the destination compaction storage region is expected to be busy receiving data from the source compaction storage region). As another example, if a memory die is targeted for a data relocation process (e.g., is targeted as a source storage region or as a destination storage region for the data relocation process), then the memory die may be associated with the second status 146.

A memory die associated with the third status 150 may be busy, may be closed to write operations, may have a defect, or may be associated with another condition. For example, if a memory die is performing an operation (e.g., a read operation or a write operation), then the memory die may be associated with the third status 150. As another example, if a memory die is closed to write operations (such as if the memory die is "full" of data or if a number of PECs of the memory die has exceeded a threshold), then the memory die may be associated with the third status 150. As an additional example, if a memory die includes a defect (such as a broken word line), the memory die may be associated with the third status 150. A defect may occur during fabrication of a memory die, during handling of a memory die (e.g., during a packaging process), or during operation of a memory die.

To open a first meta-block 190 to store the first data 176, the mapping engine 134 may be configured to select a first subset 180 (e.g., a first group) of one or more memory dies of the memory device 103 having the first status 142. For example, the mapping engine 134 may access the status table 140 to identify one or more memory dies of the memory device 103 having the first status 142, such as the first subset 180. The mapping engine 134 may select sequential (or physically adjacent) memory dies of the memory device 103, such as by using index values associated with memory dies of the memory device 103. In the example of FIG. 1, the memory dies 104a, 104b may be associated with the first status 142. The memory dies 104a, 104b may be associated with sequential index values (e.g., 0 and 1).

In accordance with the disclosure, the mapping engine 134 may dynamically select a "depth" of the first meta-block 190. As used herein, a "depth" of a meta-block may indicate an average number of word lines (or physical pages) used in each block of each memory die of the meta-block. To illustrate, if the first data 176 includes a positive integer number x of logical pages to be stored at a meta-block and if the meta-block includes two physical blocks, then a depth of the meta-block may be equal to x/2 (because x/2 physical pages of each block are to be used). In other cases, if the meta-block is to include four physical blocks (such as if four memory dies are associated with the first status 142), then a depth of the meta-block may be equal to x/4. Thus, instead of maintaining a "fixed" depth of meta-blocks and "waiting" for a number of memory dies to be available as in some devices, the mapping engine 134 may identify memory dies that are available (e.g., that are associated with the first status 142) and may dynamically determine a depth of a meta-block based on the number of available memory dies (e.g., by counting a number of physical pages of each memory die to be included in the meta-block and by dividing the number of physical pages by the number of memory dies of the meta-block).

In some cases, a depth of a meta-block may fail to satisfy a threshold for opening a meta-block. For example, if the first meta-block 190 includes one physical page of each of two blocks (the blocks 106a, 106c), then the first meta-block 190 may have a depth of one. In some cases, a depth of one fails to satisfy a threshold for opening a meta-block.

The mapping engine 134 may be configured to determine a storage size 132 associated with the first subset 180. For example, the storage size 132 may correspond to a storage capacity (e.g., a meta-block "depth") available at blocks of the memory dies of the first subset 180 for use in a meta-block.

The mapping engine 134 may be configured to determine whether the storage size 132 satisfies a threshold storage size 136. In some cases, the threshold storage size 136 is based on (e.g., is equal to) a data size of the first data 176, such as a number of bytes included in one or more ECC codewords generated by encoding the first data 176 by an ECC engine of the controller 130. In other cases, the threshold storage size 136 may be a "target" data size (e.g., depth) for a meta-block (such as an average data size associated with read requests received from the accessing device 170). In this example, the mapping engine 134 may be configured to determine the threshold storage size 136 based on a particular number of memory dies to be associated with a meta-block (e.g., based on an average number of blocks used in connection with write requests from the accessing device 170), such as by counting the number of memory dies that are associated with the first status 142 in order to determine whether the number is sufficient (or if one or more memory dies associated with the second status 146 should be included in the meta-block).

In some implementations, the mapping engine 134 may include a comparator 138. The comparator may be configured to compare the storage size 132 to the threshold storage size 136 to determine whether the storage size 132 satisfies (e.g., is greater than or equal to) the threshold storage size 136 (e.g., if the storage size 132 is equal to or greater than the threshold storage size 136). If the mapping engine 134 determines that the storage size 132 satisfies the threshold storage size 136, the mapping engine 134 may initiate a write process to write the first data 176 to the first meta-block 190.

In some cases, the mapping engine 134 may determine that the storage size 132 fails to satisfy the threshold storage size 136 (e.g., if the storage size 132 is less than the threshold storage size 136). For example, a relatively large number of memory dies of the memory device may be busy, and the storage size 132 may be relatively small so that the storage size 132 fails to satisfy the threshold storage size 136. As another example, if blocks of the first meta-block 190 are relatively "full," then the depth of the first meta-block 190 may be low.

In this case, the mapping engine 134 may access the status table 140 to select a second subset 182 (e.g., a second group) of one or more memory dies associated with the second status 146. The second subset 182 may include one or more memory dies of the memory device 103 that are physically adjacent to memory dies of the first subset 180, such as based on index values associated with one or more memory dies of the second subset 182. For example, the memory die 104c is physically adjacent to the memory die 104b. As another example, the memory die 104a may be associated with an index value of "0," the memory die 104b may be associated with an index value of "1," and the memory die 104c may be associated with an index value of "2." Selecting physically adjacent memory dies for a meta-block may simplify certain operations at the data storage device 102, such as by simplifying information indicated by the mapping table 144, as described further below.

If the storage size 132 fails to satisfy the threshold storage size 136 (e.g., if the storage size 132 is less than the threshold storage size 136), the mapping engine 134 may initiate a write process to write the first data 176 to a second meta-block 192 that includes blocks of the memory dies of the first subset 180 and the second subset 182. For example, FIG. 1 depicts that the second meta-block 192 may include the blocks 106a, 106c, and 106e.

The mapping engine 134 may exclude blocks of a third subset 184 (e.g., a third group) of one or more memory dies of the memory device 103 from the meta-blocks 190, 192. For example, if the memory die 104d is associated with the third status 150, then the mapping engine 134 may "skip" the memory die 104d by excluding blocks of the memory die 104d from the meta-blocks 190, 192 (e.g., to avoid attempting to write data to a block that is closed to write operations).

In response to initiating a write process to write the first data 176 to the first meta-block 190 or to the second meta-block 192, the mapping engine 134 may update the status table 140. For example, the mapping engine 134 may update the status table 140 to indicate that the memory dies 104a, 104b are associated with the second status 146 (as a result of writing the first data 176, or a portion of the first data 176, to the blocks 106a, 106c).

The mapping engine 134 may also update the mapping table 144 to indicate information related to the first meta-block 190 or the second meta-block 192. For example, in response to opening the first meta-block 190, the mapping engine 134 may add information 148 to the mapping table 144. In an alternate example, the information 148 may indicate the second meta-block 192 (if the second meta-block 192 is opened instead of the first meta-block 190, such as if the storage size 132 fails to satisfy the threshold storage size 136). As another example, in response to opening a third meta-block 194 (e.g., based on a request for write access from the accessing device 170 or based on initiation of a maintenance operation), the mapping engine 134 may add information 152 indicating the third meta-block 194 to the mapping table 144. Although the example of FIG. 1 depicts that the meta-blocks 190, 194 include a common number of blocks (two blocks), it should be appreciated that in some cases the meta-blocks 190, 194 may have another configuration (such as if the third meta-block 194 includes three or more blocks).

The information 148 or 152 may include a "compact" mapping of blocks of a meta-block. For example, if memory dies of a meta-block are sequential, a range of logical block addresses (LBAs) may have a compact representation. To further illustrate, if data associated with a range of LBAs is written to the second meta-block 192, the information 148 may indicate that the data is stored at sequential memory dies (the memory dies 104a-104c). In this example, two memory dies may be used to indicate the range of sequential memory dies (e.g., a "start" memory die and an "end" memory die). A compact (or "compressed") mapping scheme may also use common or similar sets of physical pages (by using similarly indexed physical pages at memory die of a meta-block). As a number of dies in a meta-block increases, indicating a range of sequential memory dies may enable a "compact" indication of memory dies of the meta-block as compared to separately indicating each memory die, which can reduce a size of the mapping table 144 (and an amount of memory used to store the mapping table 144).

In some implementations, the controller 130 is configured to store (e.g., aggregate) data at the data aggregator 154 until a data size of data stored at the data aggregator 154 satisfies a threshold data size for opening a meta-block. Use of the data aggregator 154 may reduce or avoid creation of "small" meta-blocks, which can be inefficient in some applications (e.g., by increasing a size of the mapping table 144).

To illustrate, if a first data size of the first data 176 fails to satisfy the threshold data size for opening a meta-block, the controller 130 may store (e.g., buffer) the first data 176 at the data aggregator 154. It is noted that the threshold data size for opening a meta-block may be different than (independent of) the threshold storage size 136. After storing the first data 176 at the data aggregator 154, the controller 130 may receive a second request 174 for write access to the memory device 103. The second request 174 may include second data 178, which may have a second data size.

If a sum of the first data size and the second data size satisfies the data size threshold, the mapping engine 134 may open a meta-block, such as the first meta-block 190 or the second meta-block 192. In this example, the data 176, 178 may be written to the first meta-block 190 or to the second meta-block 192 (e.g., using a single write process).

The examples of FIG. 1 enable efficient creation of a meta-region, such as a meta-block. For example, by dynamically determining a size of a meta-block based on statuses of memory dies, "waiting" for a memory die that is busy may be avoided when opening a meta-block. Thus, delays associated with opening a meta-block may be reduced or avoided in some cases, which can increase speed of operations (e.g., write operations) at the data storage device 102 by avoiding or reducing delays associated with opening a meta-block.

Although meta-blocks have been described for convenience of description in connection with FIG. 1, it should be appreciated that the foregoing description is applicable to one or more other storage regions. For example, the foregoing examples may be used in connection with one or more of a meta-meta-block, a meta-die, or a meta-meta-die.

To illustrate, the mapping engine 134 may associate the first meta-block 190 with the third meta-block 194 to create a meta-meta-block. As another example, the mapping engine 134 may associate the second meta-block 192 with the third meta-block 194 to create a meta-meta-block. A meta-meta-block is also referred to herein as a meta^2-block. It should be appreciated that a positive integer number j meta-blocks may be grouped to create a meta^j-block. Data may be written to and read from a meta-meta-block, such as by the controller 130 of FIG. 1.

The mapping engine 134 may also create one or more meta-dies (also referred to herein as a groups of dies). A meta-die (or group of dies) may include multiple memory dies. For example, a first meta-die may include the memory dies 104a, 104c. As another example, a second meta-die may include the memory dies 104b, 104d. Data may be written to and read from a meta-die, such as by the controller 130 of FIG. 1.

The mapping engine 134 may also create one or more meta-meta-dies. For example, the mapping engine 134 may associate the first meta-die with the second meta-die to create a meta-meta-die. A meta-meta-die is also referred to herein as a meta^2-die. It should be appreciated that a positive integer number k meta-dies may be grouped to create a meta^k-die. Data may be written to and read from a meta-meta-die, such as by the controller 130 of FIG. 1. Additional examples of meta-meta-blocks, meta-dies, and meta-meta-blocks are described further with reference to FIG. 2.

Figure 2:
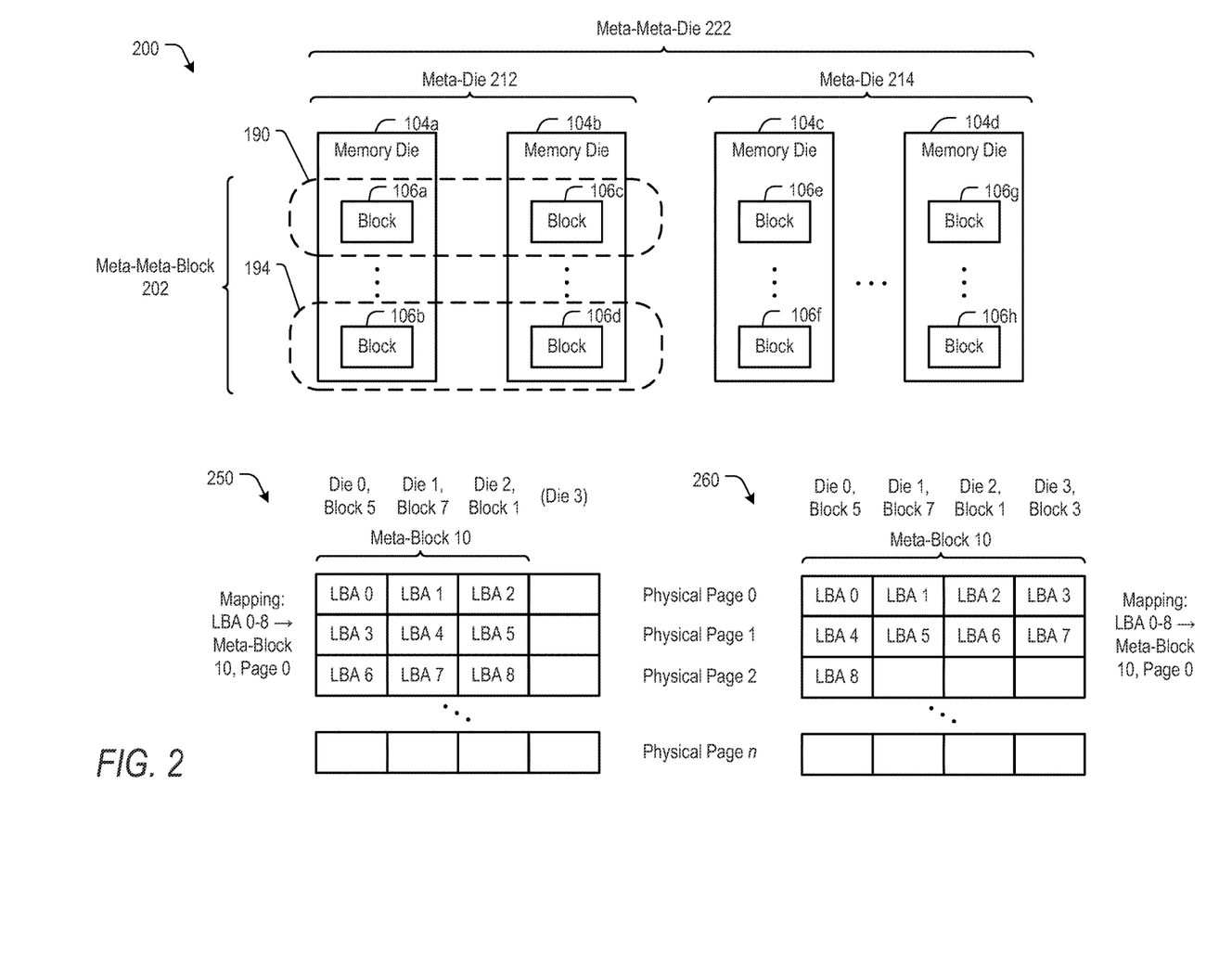
FIG. 2 is a block diagram illustrating certain aspects of a memory device, such as a memory device included in the data storage device of FIG. 1.

FIG. 2 depicts an illustrative example of a plurality of storage regions 200, an illustrative example of a first mapping scheme 250, and an illustrative example of a second mapping scheme 260. The plurality of storage regions 200 may be included in a memory device, such as the memory device 103 of FIG. 1. The mapping schemes 250, 260 may be applied at a memory device, such as the memory device 103 of FIG. 1.

The plurality of storage regions 200 include the memory dies 104a-104d. FIG. 2 depicts that the first meta-block 190 may be associated with the third meta-block 194 to create a meta-meta-block 202.

FIG. 2 also illustrates that the memory die 104a may be associated with the memory die 104b to create a meta-die 212 and that the memory die 104c may be associated with the memory die 104d to create a meta-die 214. The meta-die 212 may be associated with the meta-die 214 to create a meta-meta-die 222. The mapping table 144 of FIG. 1 (and/or one or more other tables stored by the controller 130) may indicate one or more of the meta-meta-block 202, the meta-die 212, the meta-die 214, or the meta-meta-die 222. For example, a compact mapping scheme as described with reference to the mapping table 144 of FIG. 1 may be utilized with respect to one or more of the meta-meta-block 202, the meta-die 212, the meta-die 214, or the meta-meta-die 222.

The first mapping scheme 250 illustrates a meta-block (meta-block 10) that includes blocks (blocks 5, 7, and 1) of three adjacent memory dies (dies 0, 1, and 2). In the first mapping scheme 250, a third memory die (die 3) has been "skipped." For example, the dies 0, 1, 2, and 3 may respectively correspond to the memory dies 104a, 104b, 104c, and 104d, and the meta-block 10 may correspond to the second meta-block 192. The dies 0, 1, and 2 may be associated with the first status 142, the die 3 may be associated with the first status 142 or the second status 146, and the die 3 may be associated with the third status 150.

The first mapping scheme 250 indicates that data associated with nine LBAs (LBAs 0-8) may be stored at the meta-block 10. To illustrate, the data may include the first data 176, the second data 178, or a combination thereof. In the example of FIG. 2, each block of the meta-block 10 includes n physical pages, and each physical page stores data associated with a particular LBA. To further illustrate, each physical page may store one logical page in connection with a single-level cell (SLC) implementation of the meta-block 10, or each physical page may store multiple logical pages using another implementation, such as a multi-level cell (MLC) implementation or a tri-level cell (TLC) implementation.

In the first mapping scheme 250, a depth of the meta-block 10 is equal to three because three physical pages of each block of the meta-block 10 (the physical pages 0, 1, and 2 of each of the blocks 5, 7, and 1) stores data associated with the meta-block 10. In the first mapping scheme 250, the die 3 has been "skipped" in connection with opening the meta-block 10 (e.g., in response to the die 3 being associated with the third status 150).

In another example, the die 3 may be included in the meta-block 10, such as if the die 3 is associated with the first status 142 or the second status 146 when the meta-block 10 is opened. To illustrate, the second mapping scheme 260 illustrates that the meta-block 10 may include a block 3 of the die 3. In this example, a depth of the meta-block 10 is equal to 9/4 (or 2.25) because on average 2.25 physical pages of each block of the meta-block 10 store data associated with the LBAs 0-8. A depth of a meta-block (e.g., the meta-block 10) may be selected dynamically based on a status of a memory die (e.g., based on a status of the die 3).

In some applications, use of a meta-device (e.g., the meta-meta-die 222) may reduce an amount of control information stored at the data storage device 102. For example, use of the meta-meta-die 222 may reduce a size of the mapping table 144, such as if the mapping table 144 indicates a grouping of the meta-dies 212, 214 (e.g., instead of indicating multiple groups of meta-blocks). As another example, in applications where indications of PEC counts (or estimated PEC counts) are stored by the controller 130, a single PEC count may be indicated for the meta-meta-die 222 (e.g., instead of indicating multiple PEC counts for a set of meta-blocks). Thus, the examples of FIG. 2 may improve operation of a data storage device, such as by reducing an amount of control information stored at the data storage device 102 of FIG. 1, which may enable faster operation and/or may free storage space of the memory device 103 for other information (e.g., user data).

Figure 3:
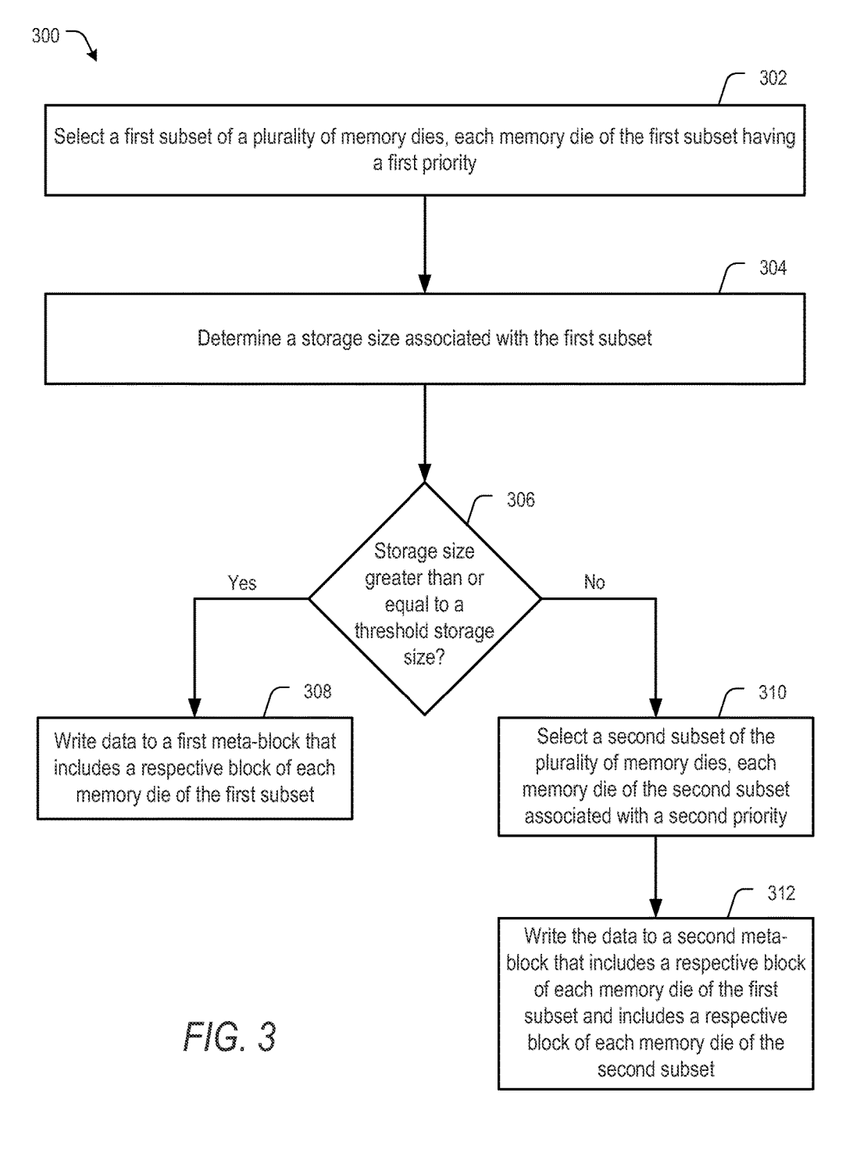
FIG. 3 is a flow diagram of an illustrative embodiment of a method of operation of a data storage device.

Referring to FIG. 3, a particular illustrative example of a method is depicted and generally designated 300. The method 300 may be performed at a data storage device, such as at the data storage device 102. One or more operations of the method 300 may be performed or initiated by the mapping engine 134.

The method 300 includes selecting a first subset of a plurality of memory dies, at 302. Each memory die of the first subset has a first priority. The first subset may correspond to the first subset 180, and the first priority may correspond to the first status 142.

The method 300 further includes determining a storage size of memory dies included in the first subset, at 304. For example, the storage size may correspond to the storage size 132.

The method 300 further includes determining whether the storage size is greater than or equal to a threshold storage size, at 306. The threshold storage size may correspond to the threshold storage size 136.

If the storage size greater than or equal to the threshold storage size, the method 300 may include writing data to a first meta-block that includes a respective block of each memory die of the first subset, at 308. For example, the first meta-block may correspond to the first meta-block 190, which includes a block of the memory die 104a (the block 106a) and a block of the memory die 104b (the block 106c). The data may include the first data 176, the second data 178, or a combination thereof.

If the storage size is less than the threshold storage size, then the method 300 may further include selecting a second subset of the plurality of memory dies, at 310, and writing the data to a second meta-block, at 312. The second meta-block includes a respective block of each memory die of the first subset and also includes a respective block of each memory die of the second subset. Each memory die of the second subset has a second priority, such as the second status 146. The second subset may correspond to the second subset 182, and the second meta-block may correspond to the second meta-block 192.

Although the mapping engine 134 and certain other components described herein are illustrated as block components and described in general terms, such components may include one or more microprocessors, state machines, and/or other circuits configured to enable the data storage device 102 (or one or more components thereof) to perform operations described herein. Components described herein may be operationally coupled to one another using one or more nodes, one or more buses (e.g., data buses and/or control buses), one or more other structures, or a combination thereof. One or more components described herein may include one or more physical components, such as hardware controllers, state machines, logic circuits, one or more other structures, or a combination thereof, to enable the data storage device 102 to perform one or more operations described herein.

Alternatively or in addition, one or more aspects of the data storage device 102 may be implemented using a microprocessor or microcontroller programmed (e.g., by executing instructions) to perform one or more operations described herein, such as one or more operations of the method 300. In a particular embodiment, the data storage device 102 includes a processor executing instructions (e.g., firmware) retrieved from the memory device 103. Alternatively or in addition, instructions that are executed by the processor may be retrieved from memory separate from the memory device 103, such as at a read-only memory (ROM) that is external to the memory device 103.

It should be appreciated that one or more operations described herein as being performed by the controller 130 may be performed at the memory device 103. As an illustrative example, in-memory ECC operations (e.g., encoding operations and/or decoding operations) may be performed at the memory device 103 alternatively or in addition to performing such operations at the controller 130.

The data storage device 102 may be coupled to, attached to, or embedded within one or more accessing devices, such as within a housing of the accessing device 170. For example, the data storage device 102 may be embedded within the accessing device 170 in accordance with a Joint Electron Devices Engineering Council (JEDEC) Solid State Technology Association Universal Flash Storage (UFS) configuration. To further illustrate, the data storage device 102 may be integrated within an electronic device (e.g., the accessing device 170), such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the data storage device 102 may be implemented in a portable device configured to be selectively coupled to one or more external devices, such as a host device. For example, the data storage device 102 may be removable from the accessing device 170 (i.e., "removably" coupled to the accessing device 170). As an example, the data storage device 102 may be removably coupled to the accessing device 170 in accordance with a removable universal serial bus (USB) configuration.

The accessing device 170 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The accessing device 170 may communicate via a controller, which may enable the accessing device 170 to communicate with the data storage device 102. The accessing device 170 may operate in compliance with a JEDEC Solid State Technology Association industry specification, such as an embedded MultiMedia Card (eMMC) specification or a Universal Flash Storage (UFS) Host Controller Interface specification. The accessing device 170 may operate in compliance with one or more other specifications, such as a Secure Digital (SD) Host Controller specification as an illustrative example. Alternatively, the accessing device 170 may communicate with the data storage device 102 in accordance with another communication protocol. In some implementations, the data storage device 102 may be integrated within a network-accessible data storage system, such as an enterprise data system, an NAS system, or a cloud data storage system, as illustrative examples.

In some implementations, the data storage device 102 may include a solid state drive (SSD). The data storage device 102 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. In some implementations, the data storage device 102 may be coupled to the accessing device 170 via a network. For example, the network may include a data center storage system network, an enterprise storage system network, a storage area network, a cloud storage network, a local area network (LAN), a wide area network (WAN), the Internet, and/or another network.

To further illustrate, the data storage device 102 may be configured to be coupled to the accessing device 170 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The memory device 103 may include a three-dimensional (3D) memory, such as a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively or in addition, the memory device 103 may include another type of memory. In a particular embodiment, the data storage device 102 is indirectly coupled to an accessing device (e.g., the accessing device 170) via a network. For example, the data storage device 102 may be a network-attached storage (NAS) device or a component (e.g., a solid-state drive (SSD) component) of a data center storage system, an enterprise storage system, or a storage area network. The memory device 103 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   a memory device including multiple groups of data storage dies, the multiple groups including a first group and a second group, the first group associated with a first priority and the second group associated with a second priority; and
   a controller coupled to the multiple groups of data storage dies, wherein the controller is configured to write data to a first meta-block if a storage size associated with the first group is greater than or equal to a threshold storage size, the first meta-block including a respective block of each data storage die of the first group, and wherein the controller is further configured to write the data to a second meta-block if the storage size associated with the first group is less than the threshold storage size, the second meta-block including a respective block of each data storage die of the first group and further including a respective block of each data storage die of the second group.

2. The data storage device of claim 1, wherein the multiple groups of data storage dies include a meta-meta-die.

3. The data storage device of claim 1, wherein the controller is further configured to store a status table indicating data storage dies associated with the first priority and data storage dies associated with the second priority.

4. The data storage device of claim 3, wherein the controller includes a mapping engine configured to access the status table to determine, in connection with a write operation to write data to the memory device, that each data storage die of the first group is associated with the first priority and that each data storage die of the second group is associated with the second priority.

5. The data storage device of claim 1, wherein the first priority indicates that each data storage die of the first group is available for a write operation and is not scheduled for a maintenance operation.

6. The data storage device of claim 1, wherein the second priority indicates that each data storage die of the second group is scheduled for a maintenance operation.

7. The data storage device of claim 1, wherein the multiple groups of data storage dies further include a third group of data storage dies, each data storage die of the third group of data storage dies having a third priority, and wherein the third priority indicates that each data storage die of the third group is unavailable for a write operation.

8. An apparatus comprising:
   a memory device, wherein the memory device includes multiple groups of data storage dies, the multiple groups of data storage dies including a first group and a second group; and
   a mapping engine, the mapping engine configured to determine that each data storage die of the first group has a first priority and that each data storage die of the second group has a second priority,
   wherein the memory device is configured to write data to a first meta-block if a storage size associated with the first group is greater than or equal to a threshold storage size, the first meta-block including a respective block of each data storage die of the first group, and
   wherein the memory device is further configured to write the data to a second meta-block if the storage size associated with the first group is less than the threshold storage size, the second meta-block including a respective block of each data storage die of the first group and further including a respective block of each data storage die of the second group.

9. The apparatus of claim 8, wherein the multiple groups of data storage dies include a third group of data storage dies, and wherein each data storage die of the third group is excluded from the first group and from the second group.

10. A method comprising:
   in a data storage device that includes a controller coupled to a memory device, wherein the memory device includes a plurality of memory dies, performing:
      selecting a first subset of the plurality of memory dies, each memory die of the first subset having a first priority;
      if a storage size associated with the first subset is greater than or equal to a threshold storage size, writing data to a first meta-block that includes a respective block of each memory die of the first subset; and
      if the storage size is less than the threshold storage size:
         selecting a second subset of the plurality of memory dies, each memory die of the second subset having a second priority; and
         writing the data to a second meta-block that includes a respective block of each memory die of the first subset and that includes a respective block of each memory die of the second subset.

11. The method of claim 10, wherein the storage size corresponds to a depth of the first meta-block.

12. The method of claim 10, wherein the first priority indicates that each memory die of the first subset has a higher priority for write operations than each memory die of the second subset.

13. The method of claim 10, wherein the second priority indicates that each memory die of the second subset is less healthy than each memory die of the first subset.

14. The method of claim 10, wherein the second priority indicates that each memory die of the second subset is scheduled for a data compaction process or for a data relocation process.

15. The method of claim 10, further comprising excluding memory dies of a third subset of the plurality of memory dies from the first meta-block or from the second meta-block.

16. The method of claim 15, wherein each memory die of the third subset is associated with a third priority.

17. The method of claim 16, wherein the third priority indicates that each memory die of the third subset is busy, is closed to write operations, or has a defect.

18. The method of claim 10, wherein the controller stores a status table, and further comprising accessing the status table to determine that each memory die of the first subset is associated with the first priority.

19. The method of claim 18, further comprising updating the status table to indicate that each memory die of the first subset is associated with the second priority after writing the data to either the first meta-block or the second meta-block.

20. The method of claim 10, further comprising:
receiving a first request for write access to the memory device from an accessing device, the first request including first data; and
receiving a second request for write access to the memory device from the accessing device, the second request including second data.

21. The method of claim 20, further comprising aggregating the first data and the second data for a single write process, wherein writing the data to the first meta-block or to the second meta-block includes writing the first data and the second data to the first meta-block or to the second meta-block via the single write process.

* * * * *